(12) United States Patent
Riess et al.

(10) Patent No.: US 7,143,013 B2
(45) Date of Patent: Nov. 28, 2006

(54) RELIABLE SYMBOLS AS A MEANS OF IMPROVING THE PERFORMANCE OF INFORMATION TRANSMISSION SYSTEMS

(75) Inventors: Eilon Riess, London (GB); Laurence Turner, Herts (GB); Les Sabel, Swindon (GB); Stuart Schwartz, Princeton, NJ (US)

(73) Assignee: Verticalband, Limited, London (GB)

( * ) Notice: Subject to any disclaimer, the term of this patent is extended or adjusted under 35 U.S.C. 154(b) by 815 days.

(21) Appl. No.: 09/836,281

(22) Filed: Apr. 18, 2001

(65) Prior Publication Data

US 2002/0007257 A1    Jan. 17, 2002

Related U.S. Application Data

(63) Continuation-in-part of application No. PCT/DE99/01907, filed on Jul. 1, 1999, and a continuation-in-part of application No. PCT/AU99/00482, filed on Jun. 16, 1999.

(30) Foreign Application Priority Data

Sep. 20, 2000  (GB) ................. 0016938.3
Feb. 5, 2001   (GB) ................. 9926167.9

(51) Int. Cl.
*G06F 17/10*     (2006.01)

(52) U.S. Cl. .................. 703/2; 375/342; 375/147; 375/283; 375/341

(58) Field of Classification Search .......... 375/148, 375/261, 343, 341, 355, 346, 147, 283; 370/203, 370/482, 347, 441; 714/776; 703/2
See application file for complete search history.

(56) References Cited

U.S. PATENT DOCUMENTS

| | | | |
|---|---|---|---|
| 4,227,152 | A | 10/1980 | Godard et al. |
| 4,847,797 | A | 7/1989 | Picchi et al. |
| 5,214,675 | A | 5/1993 | Mueller et al. |
| 5,229,767 | A | 7/1993 | Winter et al. |
| 5,444,712 | A | 8/1995 | Betts et al. |
| 5,533,048 | A | 7/1996 | Dolan |
| 5,533,050 | A | 7/1996 | Isard et al. |
| 5,541,964 | A | 7/1996 | Cohen et al. |
| 5,550,924 | A | 8/1996 | Helf et al. |
| 5,553,102 | A | 9/1996 | Jasper et al. |
| 5,694,423 | A | 12/1997 | Larsson et al. |

(Continued)

FOREIGN PATENT DOCUMENTS

EP     0 625 829 A2    11/1984

(Continued)

OTHER PUBLICATIONS

Robert Hails, Jr. "technical presentation as part of interview at USPTO, Presentation slides", Dec. 14, 2005.*

(Continued)

*Primary Examiner*—Paul L. Rodriguez
*Assistant Examiner*—Kandasamy Thangavelu
(74) *Attorney, Agent, or Firm*—Kenyon & Kenyon

(57) ABSTRACT

All practical communication channels impose some type of corruption on received data through inter-symbol interference (ISI). ISI corruption is particularly acute in high-order constellation transmission. Although ISI effects of high-order constellation transmission are very large on average, some symbols may be received that suffer relatively low levels of ISI. These symbols are "reliable symbols" and can be used to provide blind estimation of the ISI coefficients. Once the ISI effects of a channel are known, all captured signals may be corrected.

57 Claims, 7 Drawing Sheets

U.S. PATENT DOCUMENTS

| | | | |
|---|---|---|---|
| 5,742,642 A | 4/1998 | Fertner | |
| 5,793,807 A | 8/1998 | Werner et al. | |
| 5,809,074 A | 9/1998 | Werner et al. | |
| 5,818,876 A | 10/1998 | Love | |
| 5,825,832 A | 10/1998 | Benedetto | |
| 5,835,731 A | 11/1998 | Werner et al. | |
| 5,867,539 A | 2/1999 | Koslov | |
| 5,887,035 A | 3/1999 | Molnar | |
| 5,889,823 A * | 3/1999 | Agazzi et al. | 375/341 |
| 5,901,185 A * | 5/1999 | Hassan | 375/346 |
| 5,940,440 A | 8/1999 | Werner et al. | |
| 6,075,816 A | 6/2000 | Werner et al. | |
| 6,115,433 A | 9/2000 | de Lantremange | |
| 6,259,743 B1 | 7/2001 | Garth | |
| 6,272,171 B1 | 8/2001 | Okunev et al. | |
| 6,275,990 B1 | 8/2001 | Dapper et al. | |
| 6,278,730 B1 | 8/2001 | Tsui et al. | |
| 6,304,593 B1 | 10/2001 | Alouini et al. | |
| 6,304,594 B1 | 10/2001 | Salinger | |
| 6,310,909 B1 | 10/2001 | Jones | |
| 6,347,125 B1 * | 2/2002 | Dent | 375/341 |
| 6,421,394 B1 | 7/2002 | Tanrikulu | |
| 6,426,972 B1 | 7/2002 | Endres et al. | |
| 6,438,174 B1 * | 8/2002 | Isaksson et al. | 375/261 |
| 6,456,669 B1 | 9/2002 | Sakoda | |
| 6,477,215 B1 * | 11/2002 | Temerinac | 375/355 |
| 6,487,244 B1 | 11/2002 | Betts | |
| 6,490,270 B1 | 12/2002 | Krishnamoorthy et al. | |
| 6,549,584 B1 | 4/2003 | Gatherer et al. | |
| 6,556,634 B1 * | 4/2003 | Dent | 375/343 |
| 6,560,272 B1 * | 5/2003 | Komatsu | 375/147 |
| 6,567,475 B1 | 5/2003 | Dent et al. | |
| 6,570,910 B1 * | 5/2003 | Bottomley et al. | 375/148 |
| 6,577,683 B1 | 6/2003 | Waldron et al. | |
| 6,581,179 B1 * | 6/2003 | Hassan | 714/776 |
| 6,590,860 B1 * | 7/2003 | Sakoda et al. | 370/203 |
| 6,603,752 B1 | 8/2003 | Saifuddin et al. | |
| 6,618,451 B1 | 9/2003 | Gonikberg | |
| 6,661,837 B1 | 12/2003 | Abdelilah et al. | |
| 6,665,308 B1 | 12/2003 | Rakib et al. | |
| 6,704,324 B1 | 3/2004 | Holmquist | |
| 6,717,934 B1 * | 4/2004 | Kaasila et al. | 370/347 |
| 6,757,299 B1 * | 6/2004 | Verma | 370/482 |
| 6,804,267 B1 | 10/2004 | Long et al. | |
| 6,842,495 B1 | 1/2005 | Jaffe et al. | |
| 2004/0042566 A1 * | 3/2004 | Eidson et al. | 375/341 |
| 2004/0179578 A1 * | 9/2004 | Rached et al. | 375/130 |

FOREIGN PATENT DOCUMENTS

| | | |
|---|---|---|
| EP | 0 845 891 A2 | 6/1998 |
| EP | 1 024 631 A1 | 8/2000 |
| WO | WO 99/23795 | 5/1999 |

OTHER PUBLICATIONS

Kwon et al, "A Blind Equalization with the Variable Decision Region", *Pers. Indoor and Mobile R. Comm.*, vol. 2, pp. 322-326 (Sep. 1997).

Lee et al, "A Decision-Directed Blind Equalization with the Error Variance Estimation", vol. 1, pp. 99-103, IEEE, (Oct. 1997).

Lee et al, "Convergence Analysis of the Stop-and-Go Blind Equalization Algorithm", *IEEE Trans. Comm.*, vol. 47, No. 2, pp. 177-180, (Feb. 1999).

Xu et al, "An Improved Decision-Directed Equalization Algorithm for MQAM Modulation", *Chinese Journal of Electronics*, vol. 9, pp. 45-51 (1997).

Xu et al, "New Decision-Directed Equalization Algorithm for QAM Communication Systems", *IEEE Global Telecommunications Conference 1996*, vol. 2, pp. 1330-1334, (1996).

Werner et al, "Blind Equalization for Broadband Access", *IEEE Comm.*, vol. 37, No. 4, pp. 87-93, (Apr. 1999).

Lee et al, "Joint Blind Equalization with a Shell Partition-Based CMA for QAM Signal Constellations", IEEE Int'l. Conference on Acoustics, Speech, and Signal Processing, IEEE Computer Society Press, pp. 2513-2516, (Apr. 21-24, 1997).

Tseng et al, "A Stop-and-Go Dual-Mode Algorithm for Blind Equalization", Globecom 96, vol. 2, pp. 1427-1431, (Nov. 18-22, 2996).

Garth et al, "Blind Equalization Algorithms with Automatic Constellation Phase Recovery for Dual-Mode CAP-QAM Reception", 1999 IEEE Int'l. Conference on Communications, vol. 3, pp. 1531-1536, (Jun. 6-10, 1999).

Axford et al, "A Dual-Mode Algorithm for Blind Equalization of QAM Signals: CADAMA", 29th Asilomar Conference on Signals, Systems & Computers, vol. 1, pp. 172-176, (Oct. 30-Nov. 1, 1995).

Weerackody et al, "Dual-Mode Type Algorithms for Blind Equalization", *IEEE Transactions on Communications*, vol. 42, No. 1, pp. 22-28, (Jan. 1994).

Jablon, Neil K., "Joint Blind Equalization, Carrier Recovery, and Timing Recovery for High-Order QAM Signal Constellations", *IEEE Transactions on Signal Processing*, pp. 1383-1397, vol. 40, No. 6, Jun. 1992.

Johnson et al, "Blind Equalization Using the Constant Modulus Criterion: A Review", *Proceedings of the IEEE*, pp. 1927-1950, vol. 86, No. 10, Oct. 1998.

Yang et al, "The Multimodulus Blind Equalization Algorithm", 1997 13th Int'l Conference on Digital Signal Processing Proceedings, DSP 97, pp. DSP 97-127 through DSP 97-130, vol. 1 of 2, Jul. 2-4, 1997, Santorini, Hellas (Greece).

Treichler et al, "Practical Blind Demodulators for High-Order QAM Signals", *Proceedings of the IEEE*, Special Issue on Blind Systems Identification and Estimation, edited by R. Liu and L. Tong, pp. 1907-1926, vol. 86, No. 10, Oct. 1998.

Gertsman et al, "Symbol-by-Symbol MAP Demodulation of CPM and PSK Signals on Rayleigh Flat-Fading Channels", *IEEE Transactions on Communications*, pp. 788-799, vol. 45, No. 7, Jul. 1997.

Bendetto et al, "A Soft-Input Soft-Output APP Module for Iterative Decoding of Concatenated Codes", *IEEE Communications Letters*, pp. 22-24, vol. 1, No. 1, Jan. 1997.

Kenington, P.B., "Emerging Technologies for Software Radio", *Electronics Communication Engineering Journal*, pp. 69-83, vol. 11, No. 2, Apr. 1999.

Porat et al, "Blind Equalization of Digital Communication Channels Using High-Order Moments", *IEEE Transactions on Signal Processing*, vol. 39, No. 2, Feb. 1991.

Bahl et al, "Optimal Decoding of Linear Codes for Minimizing Symbol Error Rate", *IEEE Transactions on Information Theory*, pp. 284-287, vol. IT-20, No. 2, Mar. 1974.

Sato, Yoichi, "A Method of Self-Recovering Equalization for Multilevel Amplitude-Modulation Systems", *IEEE Transactions on Communications*, vol. COM-23, No. 6, Jun. 1975.

Viterbi et al, *Principals of Digital Communication and Coding*, Chapter 2, pp. 47-127, McGraw-Hill Book Company, 1979.

Proakis, John G., *Digital Communications*, Chapters 5, 6, 10, 11, Third Edition, McGraw-Hill, Inc., 1983.

Godard, Dominique N., "Self-Recovering Equalization and Carrier Tracking in Two-Dimensional Data Communication Systems", *IEEE Transactions on Communications*, vol. Com-28, No. 11, pp. 1867-1875, Nov. 1980.

Kong et al, "Detection of Amplitude-Phase Modulated Signals Over Frequency Nonselective Rayleigh Fading Channels with Adaptive Symbol-Aided Channel Estimation" IEEE Vehicular Technology Conference, Atlanta, Georgia, USA, IEEE, Conf. 46, Apr. 28-May 1, 1996, ISBN 0-7803-3158-3.

Hoeher, Peter, "TCM on Frequency-Selective Fading Channels: A Comparison of Soft-Output Probabilistic Equalizers", Proceedings of the Global Telecommunications Conference and Exhibition (GLOBECOM), USA, New York, IEEE, Dec. 2, 1990, ISBN 0-87942-632-2.

Kong et al, "Adaptive MLSE of QAM Signals over Frequency Nonselective Rayleigh Fading Channels", IEE Proceedings: Communications, Great Britain, Institution of Electrical Engineers, vol. 145, No. 6, Dec. 1998, ISSN 1350-2425.

Hart et al, "Maximum-Likelihood Synchronization, Equalization, and Sequence Estimation for Unknown Time-Varying Frequence-Selective Rician Channels", IEEE Transactions on Communications, USA, IEEE Inc., New York, vol. 46, No. 2, Feb. 1, 1998, ISSN 0090-6778.

* cited by examiner

100

200

1000

2000

3000

300

3000

400

RELIABLE SYMBOLS AS A MEANS OF IMPROVING THE PERFORMANCE OF INFORMATION TRANSMISSION SYSTEMS

CROSS-REFERENCE TO RELATED APPLICATIONS

This application is a continuation-in-part of the following applications: PCT/DE99/01907 WIPO 00/02648, filed Jul. 1, 1999 (which benefits from the priority of UK application 9926167.4, filed Nov. 4, 1999), and PCT/AU99/00482 WIPO 0/02634, filed Jun. 16, 1999 (which benefits from the priority of UK application 16938.3, also filed Jul. 10, 2000), the disclosure of which is incorporated herein by reference. Certain claims may benefit from the priority of these applications.

BACKGROUND

The present invention relates to a data processing technique that permits identification of reliable symbols in the presence of Inter-Symbol Interference ("ISI") and other data correlated noise (collectively, "ISI"). Data correlated noise refers to a variety of phenomena in data processing systems in which a data signal interferes with itself at a destination. The present invention also relates to the use of reliable symbols to determine values of source symbols that are corrupted by ISI. The present invention finds application in systems where source symbols are members of high-order constellations. Previously, such systems have required the use of training symbols for operation in the presence of real-world ISI phenomenon.

FIG. 1 illustrates an exemplary data processing system 100 in which ISI may occur. A source 110 may generate a data signal X (herein, a "source data signal"). When delivered to a destination 120 as a received signal Y, the source data signal X may be corrupted by ISI sources 130. For example, multiple copies of a single data signal X may be captured at the destination 120, each copy being received with an unknown time shift and gain with respect to the other copies. Further, the time shifts and gains may vary over time.

ISI phenomena may be modeled mathematically. In the case where the data signal X is populated by a number of data symbols $x_n$, captured signals $y_n$ at the destination 120 may be represented as:

$$y_n = a_0 \cdot x_n + f(x_{n-K_1}, \ldots, x_{n-1}, x_{n+1}, \ldots, x_{n+K_2}) + \omega_n. \quad (1)$$

where $a_0$ represents a gain factor associated with the channel 130, $f(x_{n-K_1}, \ldots, x_{n+K_2})$ is a functional representation that relates the ISI to the symbols, $x_{n-K_1}, \ldots, x_{n+K_2}$ causing ISI corruption and $\omega_n$ represents corruption from other sources. In linear systems, Eq. 1 may reduce to:

$$y_n = x_n + \sum_{\substack{i=-K_1 \\ i \neq 0}}^{K_2} a_i \cdot x_{n-i} + \omega_n \quad (2)$$

where $a_{-K_1}, \ldots a_{K_2}$ represent the values of the impulse response of the channel. In accordance to common practice, the values $a_i$ have been normalized by the value of $a_0$ in Eq. 2.

ISI may arise from a variety of real-world phenomena. Multipath is an example of ISI that occurs in wireless and other communication systems. In a wireless system 200, shown in FIG. 2, a base station 210 may transmit data addressed to a mobile station 220 over a region of space, typically a cell or a cell sector. The mobile station 220 may receive the signal via a direct line-of-sight path and also may receive copies of the data signal via other indirect paths. The indirect paths may be caused by reflections of the transmitted signal from structures in the transmission environment such as buildings, trucks, mountains and the like. At the mobile station 200, the directly received and indirectly received signals interfere with each other. The indirect transmissions, however, because they travel a longer propagation path before they reach the mobile station, are delayed with respect to the direct path signal.

ISI is seen as a serious impediment to the use of high-order constellations for data processing systems. A "constellation" represents a set of unique values that may be assigned to data symbols. Several examples are shown in FIG. 3. FIGS. 3(a)–(c) illustrate constellations for amplitude shift keying ("ASK") applications where symbols can take one of four, eight or sixteen unique values. When compared to a binary symbol constellation, use of these constellations yields data throughput increases by factors of 2 (four levels), 3 (eight levels) or 4 (sixteen levels). FIGS. 3(d)–(f) illustrate constellations for quadrature amplitude modulation ("QAM") applications where symbols can take one of four, sixteen or sixty-four unique values. When compared to a binary symbol constellation, use of these constellations yield data throughput increases of 2 (four levels), 4 (sixteen levels) and 6 (sixty-four levels). Thus, use of high-order constellations in data processing systems can yield increased throughput over binary systems within the same bandwidth.

The problem is that, when using high-order constellations, blind equalization (equalization without either an initial training sequence, or 'refresher' training sequences) is very hard to achieve because the detrimental effects of ISI increase with increasing constellation order.

There is a need in the art for a data transmission system that, in the presence of realistic levels of ISI, uses blind techniques to decode symbols from a high-order constellation.

DETAILED DESCRIPTION

Embodiments of the present invention identify reliable symbols from a sequence of captured signal samples at a destination. Although the ISI effects associated with high-order symbol constellation transmissions impose large signal corruption on average, some samples suffer relatively low levels of ISI. These samples are the reliable symbols. Having identified reliable symbols from a sequence of captured signal samples, it is possible to reliably estimate the actual source symbols for all captured signal samples.

Identification of Reliable Symbols

Figure 3:
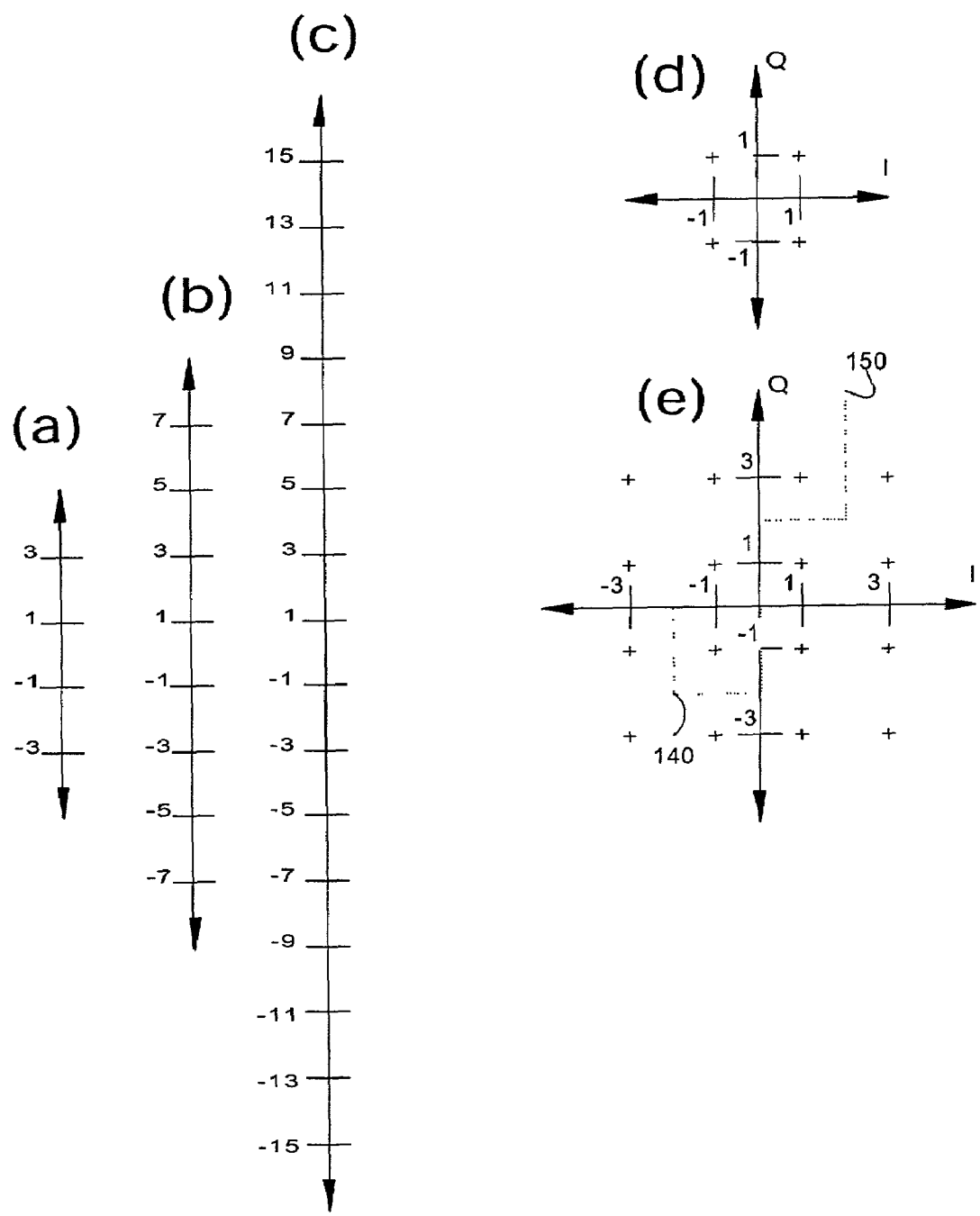
FIG. 3 illustrates various symbol constellations.
Figure 3:
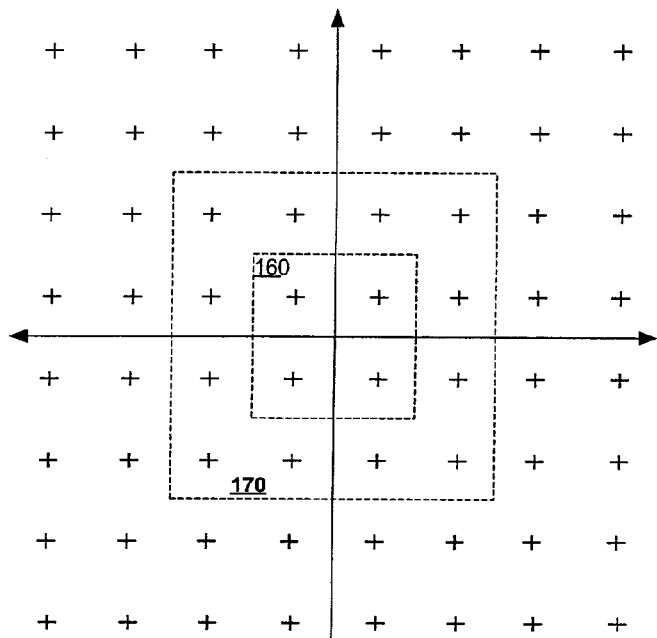
Figure 3:
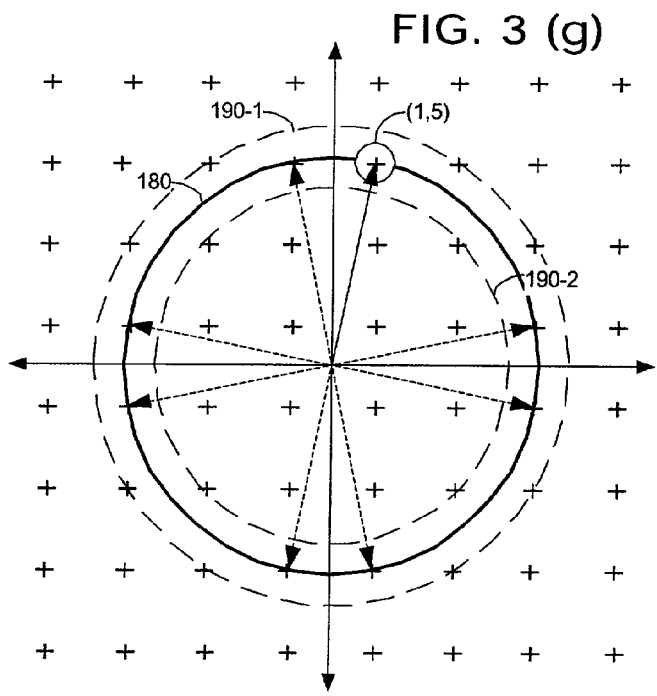

A "reliable symbol" is a captured sample $y_n$ that is very likely to be located within a decision region of a corresponding source symbol $x_n$ transmitted from the source 110 at time n. At a destination 120, each constellation symbol is associated with a decision region that represents a set of all points that are closer to the respective symbol than to any other symbol in the constellation. FIG. 3(e) shows exemplary decision regions 140, 150 for symbols −1,−1 and 1,3 in the 16-level QAM constellation. For a reliable symbol, the combined ISI and additive noise effects and other channel and system impairments are unlikely to have pushed the captured sample $y_n$ from a decision region of the symbol $x_n$ from which it originated.

According to an embodiment of the present invention, identification of a signal $y_n$ as "reliable" may be carried out using a reliability factor $R_n$ given by:

$$R_n = \sum_{\substack{i=-K_1 \\ i\neq 0}}^{K_2} |y_{n-i}| \cdot c_i \quad (3)$$

where the $c_i$ are constants representing any priori knowledge of the ISI effect that may be available. Generally, if nothing is known about the ISI, then the $c_i$'s may all be set equal to 1. In other situations, additional information as to the nature of the channel 130 may be known and the $c_i$'s may be given values reflecting this information. If the reliability factor of a sample $y_n$ is less than a predetermined limit value, designated "$d_{lim}$" herein, the sample may be designated as a "reliable symbol."

Where samples on only one side of a candidate sample $y_n$ contribute to the ISI, the reliability factor of the sample $y_n$ may be determined using:

$$R_n = \sum_{i=1}^{K} |y_{n-i}| \cdot c_i. \quad (4)$$

where $K=K_2$ in equation (2). In respect to the forgoing reliability factors (equations (3) and (4)) the $y_n$'s may be real for one-dimensional signal structures or complex for two-dimensional signal structures.

For systems using two-dimensional constellations, such as the QAM constellations shown in FIGS. 3(d)–(f), the reliability factor may be determined using:

$$R_n = \sum_{\substack{i=-K_1 \\ i\neq 0}}^{K_2} \sqrt{y^2_{1_{n-1}} + y^2_{2_{n-1}}} \cdot c_i \quad (5)$$

where $y_{1_{n-i}}^2$ and $y_{2_{n-i}}^2$ respectively represent values of $Y_{n-i}$ in the first and second dimensions.

Figure 4:
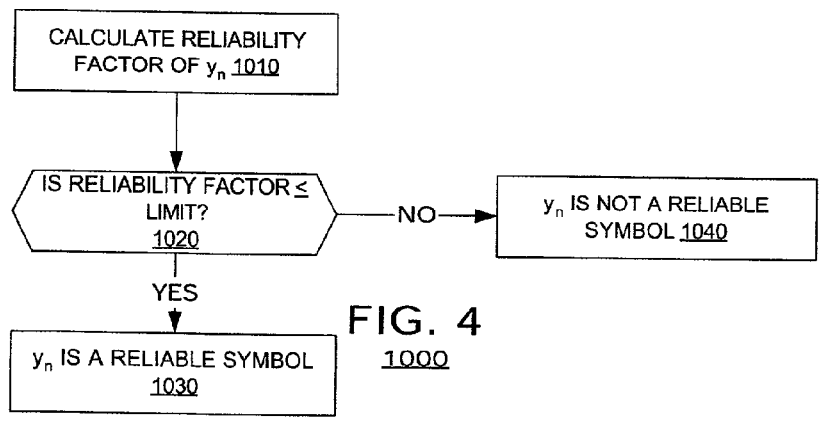
FIG. 4 illustrates a method of operation for detecting reliable symbols according to an embodiment of the present invention.

FIG. 4 is a flow diagram of a reliable symbol detection method 1000 according to an embodiment of the present invention. According to the method, reliable symbol detection may begin by calculating a reliability factor of a sample $y_n$ based on values of neighboring samples (box 1010). Thereafter, the method may determine whether the reliability factor is less than or equal to a predetermined threshold (box 1020). If so, the sample $y_n$ may be designated as a reliable symbol (box 1030). Otherwise, the sample $y_n$ is not reliable.

The predetermined threshold $d_{lim}$ may be determined based on the applications for which the identification method is to be used. In one embodiment, the threshold may be set to the value $d_{lim}=(K_1+K_2)\cdot d_{min}$ where $d_{min}$ is half the distance between two constellation points that are closest together. This threshold is appropriate for the case where $$\frac{1}{|a_0|} \sum_{\substack{i=K_1 \\ i\neq 0}}^{K_2} |a_i| \leq 1.$$

Experiments have shown, however, that operation can be maintained using the same threshold when $$\frac{1}{|a_0|} \sum_{\substack{i=K_1 \\ i\neq 0}}^{K_2} |a_i| \leq 1.4.$$

The threshold $d_{lim}$ also may vary over time. If the predetermined threshold is increased, then an increased number of samples will be accepted as reliable symbols though, of course, all of these symbols will not be of the same reliability. Similarly, by decreasing the threshold $d_{lim}$, the number of samples that are designated as reliable symbols will decrease. These symbols will be those symbols with lower reliability factors. During operations of a reliable symbol detection method, the threshold $d_{lim}$ may be varied to maintain a rate of detected reliable symbols at a desired value. For example, if a rate of detected symbols falls below a first rate threshold, the $d_{lim}$ value may be increased. Or, if the rate of detected symbols exceeds a second rate threshold, the $d_{lim}$ value may be decreased.

Figure 5:
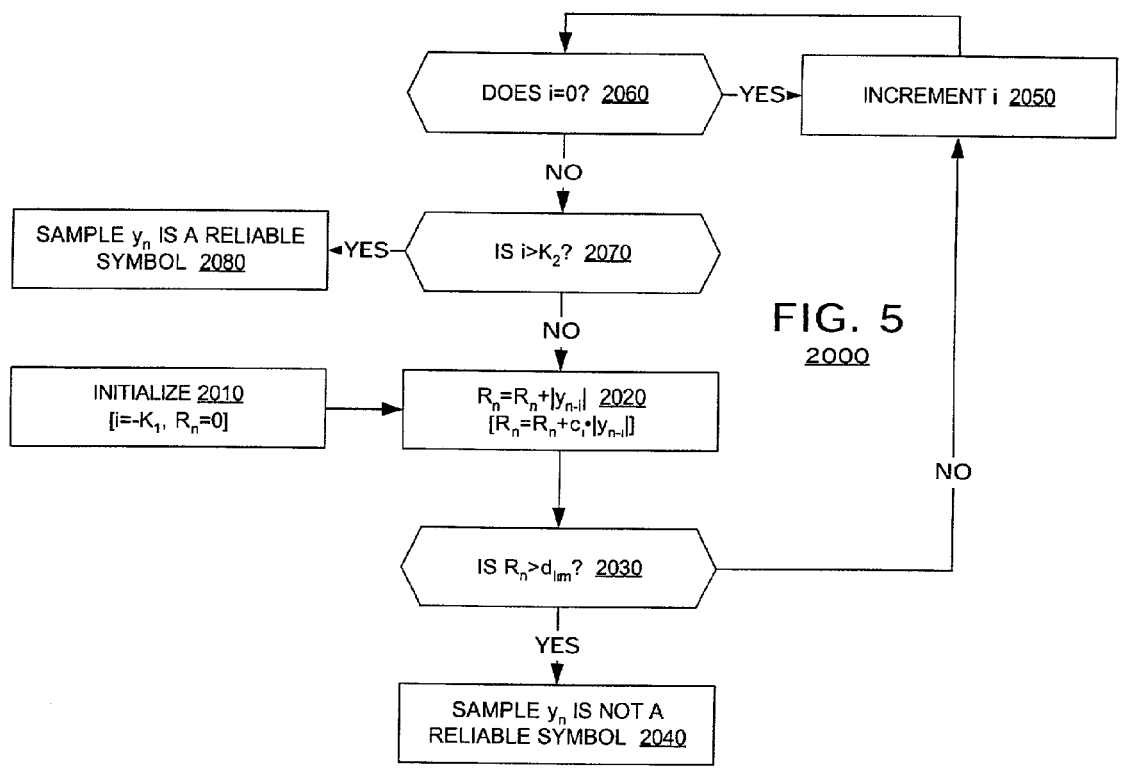
FIG. 5 illustrates a method of operation for detecting reliable symbols according to an embodiment of the present invention.

FIG. 5 is a flow diagram of a method of operation 2000 to determine whether a candidate sample $y_n$ is a reliable symbol. For operation of the method, an index variable i may be set to $-K_1$ and a reliability counter $R_n$ may be set to zero ($R_n=0$) (box 2010). The method may begin by adding to reliability counter $R_n$ the value of a sample $y_{n-i}$ ($R_n=R_n+|y_{n-i}|$) (box 2020). Thereafter, if the reliability counter $R_n$ exceeds a predetermined limit (box 2030), the candidate symbol may be disqualified as a reliable symbol (box 2040). In this case, operation of the method 2000 may cease for the candidate sample $y_n$.

If at box 2030 the reliability counter $R_n$ does not exceed the predetermined limit, the method may continue. The index value i may be incremented (box 2050). If i=0, if n−i points to the candidate symbol $y_n$ itself (box 2060), the index value may be incremented again. Otherwise, the method 2000 may determine whether i is greater than $K_2$ (box 2070). If so, then the candidate sample $y_n$ is a reliable symbol (box 2080). Otherwise, the method may return to the operation at box 2020 and add to the reliability counter based on the value of the next sample $Y_{n-i}$.

The foregoing description of the method 2000 has presented operation when no a priori knowledge of the channel is available at the destination 120 (e.g., $c_i=1$ for all i). When knowledge of the channel is available and $c_i$ values may be determined for one or more i, then at box 2020 the reliability counter $R_n$ may increment according to $R_n=R_n+c_i\cdot|y_{n-i}|$ (shown as bracketed text in box 2020).

In this way, the method of operation 2000 examines the neighboring samples of $y_n$ ($K_1$ precursors and $K_2$ postcursors) to see if $y_n$ meets the criterion for being a reliable symbol.

When a destination captures a plurality of samples $y_n$, each sample may be considered according to the method of FIG. 5 to determine whether the sample is a reliable symbol. Operation of the method 2000 can be accelerated in certain embodiments. If, for example, a sample, say $y_j$, by itself exceeds the reliability threshold then none of the neighboring symbols $y_i$, $i=j-K_1$ to $j+K_2$, can be reliable symbols. In this case, the method 2000 need not be operated upon these neighboring symbols. The procedure can advance by skipping ahead to examine the first sample $y_n$ that does not include $y_j$ in its group of surrounding samples. In this embodiment, although the value of $y_j$ may disqualify neighboring samples from being reliable symbols, $y_j$ itself may be a reliable symbol. The method 2000 may operate on $y_j$ to determine whether it is a reliable symbol.

Additionally, the surrounding samples may be selected, as a sub-set of the full range $i=-K_1$ to $K_2$ and the associated surrounding symbols be examined. If a sequence of, say, three symbols $y_j$ to $y_{j+2}$ have values that would cause the reliability limit $d_{lim}$ to be exceeded, then any symbol $y_i$ having the sequence of symbols within the $-K_1$ to $K_2$ window need not be considered under the method 2000 of FIG. 5.

An alternate embodiment finds application where ISI corruption is expected to be linear and caused by symbols from only one side of a candidate symbol, according to:

$$y_n = x_n + \sum_{i=1}^{K_2} a_i \cdot x_{n-i} + \omega_n \quad (6)$$

In such an embodiment, the iterative scan illustrated in FIG. 5 may simplify since $K_1$ is equal to zero.

Figure 6:
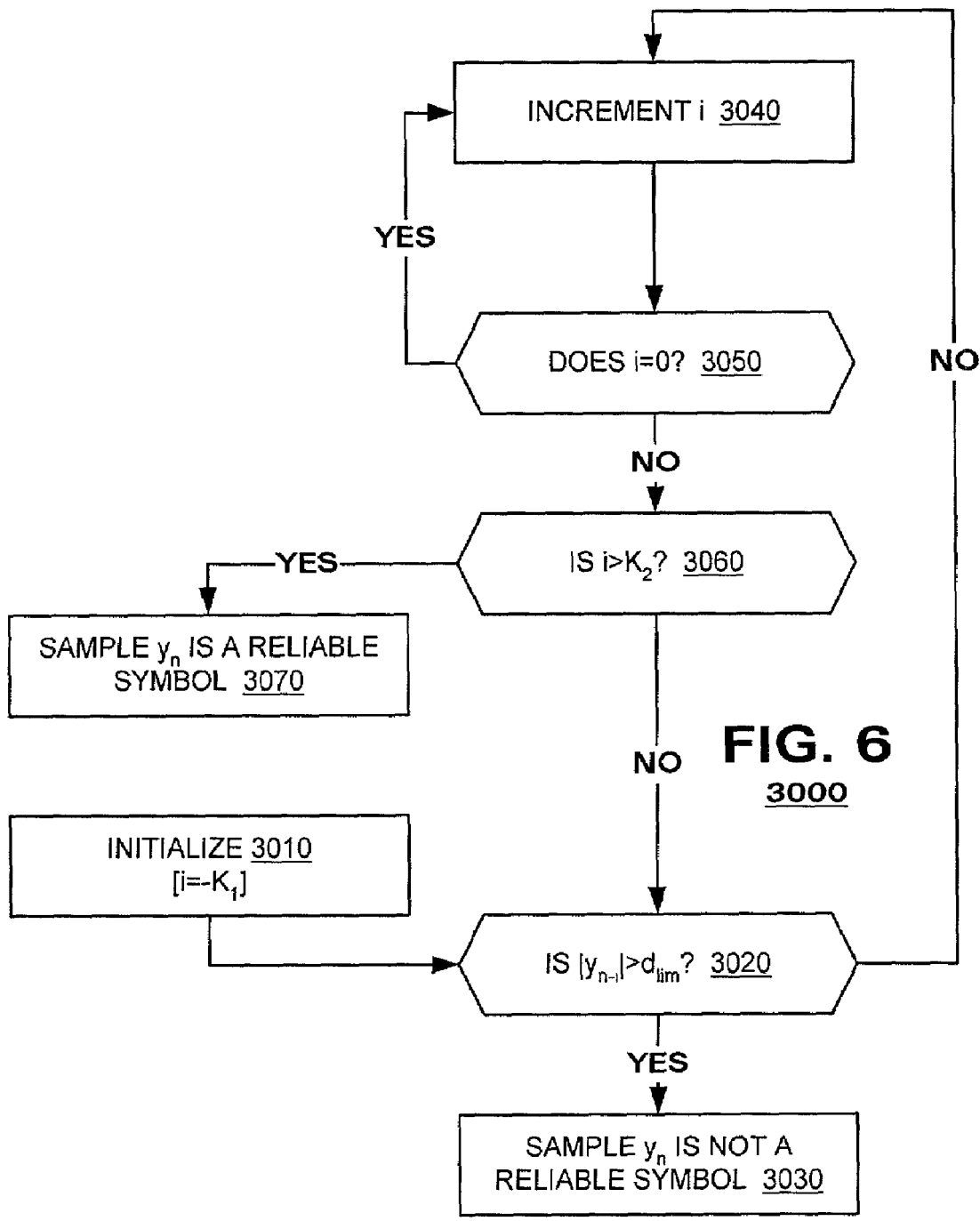
FIG. 6 illustrates another method of operation 3000 for detecting reliable symbols

FIG. 6 illustrates another method of operation 3000 for detecting reliable symbols when ISI effects are expected to be linear and no knowledge of the coefficients $c_i$ is available. The method 3000 may initialize an index value i to $-K_1$ (box 3010). The method may determine whether the absolute value of a symbol $Y_{n-i}$ occurs within a predetermined limit (box 3020). If not, the method terminate for candidate symbol $y_n$; it will not be designated as a reliable symbol (box 3030). If the value of $y_{n-i}$ does occur within the predetermined limit, however, the method may increment i (box 3040). Thereafter, the method may determine whether i=0 (box 3050). If so, the method may return to box 3040 an increment i again. Thereafter, the method may determine whether $i>K_2$ (box 3060). If so, the sample $y_n$ may be designated as a reliable symbol (box 3070). If not, the method may return to box 3020 for testing of other samples.

In QAM systems, there are several alternatives to detect reliable symbols. As shown in FIGS. 3(d)–(f), QAM constellation points may be mapped as a two-dimensional coordinate space of in-phase data ("I") and quadrature-phase data ("Q"). In the simplest embodiment, where ISI is known to corrupt I data and Q data independently of each other, reliability factors may be established independently for I and Q data. That is, any of the methods of FIG. 6 may be performed for independently I and Q data. A sample's reliability may be calculated for the Q domain without regard for the sample's I value and also calculated for the I domain without regard for the sample's Q value. It may occur that a symbol will be considered reliable for I but not for Q or vice versa. This is appropriate since this technique is to be used in circumstances where it is known that the ISI in each domain are independent.

The method of FIG. 6 finds application in other embodiments where ISI is not known to be real. In such a case, the predetermined limit may be based on rectangular "rings" of the constellation. With reference to FIG. 3(f), for example, a first constellation ring may include the set of (I,Q) constellation points: 1,1, 1,–1, –1,–1 and –1,–1 (shown as 160 in FIG. 3(f)). A second constellation ring may include the set of constellation points: 3,3, 3,1, 3,–1, 3,–3, 1,–3, –1,–3, –3,–3, –3,–1, –3,1, –3,3, –1,3 and 1,3 (shown as 170 in FIG. 3(f)). Higher order constellations may have additional rings. In this embodiment, the method determines whether values of the samples $Y_{n-i}$ occur within a predetermined rectangular ring or any lower-order ring.

Alternatively, reliable symbols may be identified according to one or more of the techniques described in the Applicant's co-pending PCT patent application PCT/GB00/02634, entitled "Adaptive Blind Equaliser," filed Jul. 10th Jul. 2000, the subject matter of which is incorporated herein by reference.

The foregoing discussion has described various embodiments for identification of reliable symbols in a captured signal stream. Reliable symbols may be decoded immediately without further processing. Thus, for the set $Y_{RS}$ of reliable symbols, $y_n \epsilon Y_{RS}$, a data decoder in a destination 120 may generate decoded symbols $\hat{x}_n$ to be the constellation point closest to $y_n$. The decoded symbol $\hat{x}_n$ may be the destination's estimate of the source data symbol $x_n$.

The foregoing embodiments find application in applications in which captured samples $y_n$ do not exhibit phase offset with respect to the source symbols $x_n$. Of course, in some applications, it may be expected that the captured samples $y_n$ will exhibit a phase offset with respect to their source symbols $x_n$. Where captured samples $y_n$ exhibit a phase rotation with respect to the source symbols $x_n$, a "reliable symbol" may be defined alternately as a sample $y_n$ that is likely to be observed in the annular constellation ring of its source symbol $x_n$. Restated, ISI corruption is unlikely to push the source symbol $x_n$ from its constellation ring when observed as the captured sample $y_n$ at the destination 120. The reliability factor of equation 3 may be applied in this embodiment, using observed power levels of the captured samples:

$$R_n = \sum_{\substack{i=-K_1 \\ i \neq 0}}^{K_2} \mathrm{Power}(y_{n-i}) \cdot c_i, \quad (7)$$

and, when the signal is complex, equation 5 may be used.

Exemplary annular constellation rings are shown in FIG. 3(g). For any given symbol point (such as point (1,5)) there will be a plurality of symbols having the same distance from the constellation center. These symbols define a circle 180. Other constellation symbols define other circles, such as 190-1 and 190-2 in FIG. 3(g). Each circle defines a constellation ring (not shown) that includes all points in the constellation space that are closer to the circle than to any other circle in the constellation.

The methods of FIGS. 4 and 5 may find application when captured samples $y_n$ exhibit phase offset with respect to their source symbols $x_n$. In this case, the threshold $d_{lim}$ may be set according to half the width of the annular constellation ring in which the captured sample $y_n$ is observed.

In one embodiment a subset of the total range of power levels of $y_n$ may be used.

Use of Reliable Symbols

In further embodiments of the present invention, reliable symbols may be used as a basis for decoding transmitted symbols $x_n$ from received non-reliable captured samples that are not reliable symbols ($y_n \notin Y_{RS}$). A description of these embodiments follows.

Figure 1:
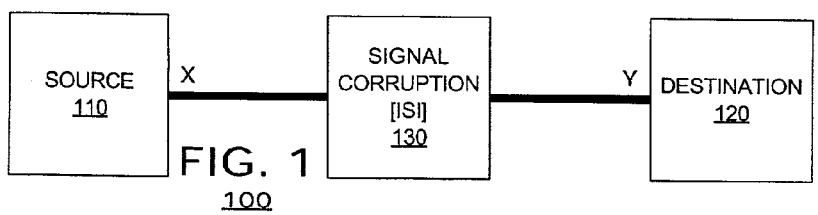
FIG. 1 illustrates an exemplary data processing system in which ISI may occur.
Figure 7:
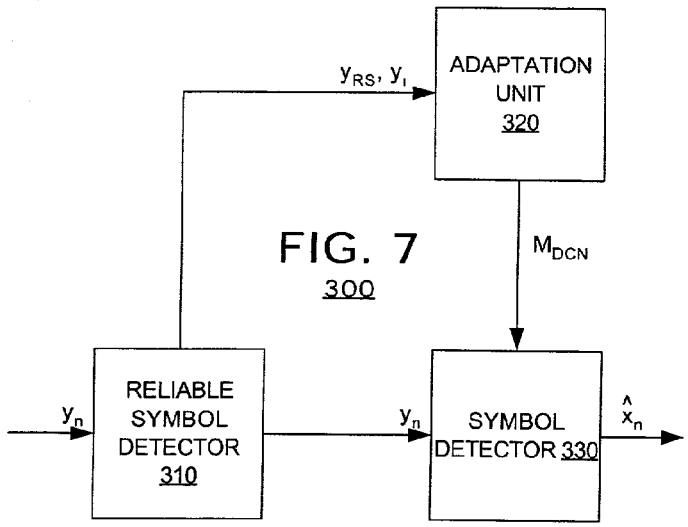
FIG. 7 is a block diagram of a data decoder according to an embodiment of the present invention.

FIG. 7 is a block diagram of a data decoder 300 according to an embodiment of the present invention. The data decoder 300 may include a reliable symbol detector 310, an adaptation unit 320 and a symbol decoder 330. The reliable symbol detector 310 may identify a plurality of reliable symbols $y_{RS} \in Y_{RS}$ from a sequence of captured samples $y_n$. The reliable symbol detector 310 may output the reliable symbols $y_{RS}$ and their surrounding samples (labeled $y_i$ in FIG. 7) to the adaptation unit 320. Based upon $y_{RS}$ and $y_i$, the adaptation unit 320 may generate ISI metrics that characterize the ISI signal corruption 130 (FIG. 1). The adaptation unit 320 may output to the symbol decoder 330 data $M_{ISI}$ representing the ISI metrics. Based upon the ISI metrics, $M_{ISI}$, the symbol decoder 330 may generate decoded symbols $\hat{x}_n$ from the captured samples $y_n$, for all n, regardless of whether the sample $y_n$ is a reliable symbol or not.

Figure 8:
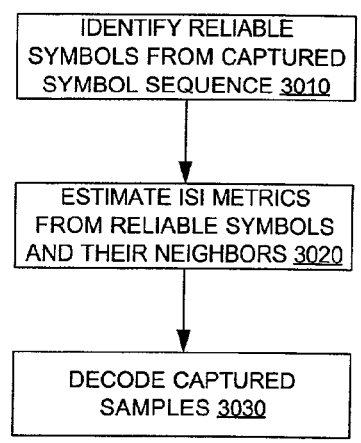
FIG. 8 illustrates a data decoding method of operation according to an embodiment of the present invention.

FIG. 8 illustrates a data decoding method 3000 according to an embodiment of the present invention. According to the method, a data decoder may identify a set of reliable symbols $Y_{RS}$ from a sequence Y of captured samples (Step 3010). Using this set of reliable symbols $Y_{RS}$ and their neighbors, the data decoder may estimate an ISI metric (Step 3020). Thereafter, using the ISI metric, the data decoder may decode symbols $\hat{x}_n$ from the sequence Y of captured samples (Step 3030).

Adaptation and symbol correction techniques per se are known. In communication applications, such techniques often are provided within channel equalizers. A variety of channel equalization techniques are known, including both time-domain equalizers and frequency-domain equalizers. At a high level, adaptation refers to the process by which the equalizer learns of the ISI corruption effects and symbol correction refers to a process by which the equalizer reverses the ISI effects to determine from the sequence of captured samples Y what the source symbol sequence X is most likely. However, for these existing techniques to work, in the presence of realistic level of ISI when operating with high-order constellations, it would be necessary to use an initializing training sequence and thereafter to use training sequences that are transmitted periodically. The use of the reliable symbols method overcomes this need. Any of a variety of known equalizers may be used with the reliable symbols technique and the adaptation process—the process by which the equalizer learns—can be rendered blind. Having learned what the ISI effects are based on the reliable symbols $y_{RS}$, the equalizer may decode symbols $\hat{x}_n$ from all of the captured samples $y_n$.

Perhaps the simplest embodiment of equalizer is the subtractive equalizer. In the subtractive equalizer, the adaptation unit 320 estimates the channel ISI coefficients $\hat{a}_i$. Using the estimated coefficients $\hat{a}_i$ the symbol decoder 330 may estimate source symbols, $\hat{x}_n$, by decoding $y'_n$ where:

$$y'_n = y_n - \sum_{i=1}^{K_2} \hat{a}_i \cdot \hat{x}_{n-i} \qquad (8)$$

in which $\hat{x}_{n-i}$ represent prior decoded symbols. The equalizer may generate a decoded symbol $\hat{x}_n$ as the constellation symbol that is closest to $y'_n$.

As noted, different types of equalizers can be used. A decision feedback equalizer (also "DFE") may be incorporated within the symbol decoder 410 of the system 400 shown in FIG. 9. Conventionally a DFE is fed with information obtained from training sequences. In an embodiment employing reliable symbols, information may be fed to the adaptation unit 420. The adaptation unit 420 may update the tap settings of the DFE.

Figure 9:
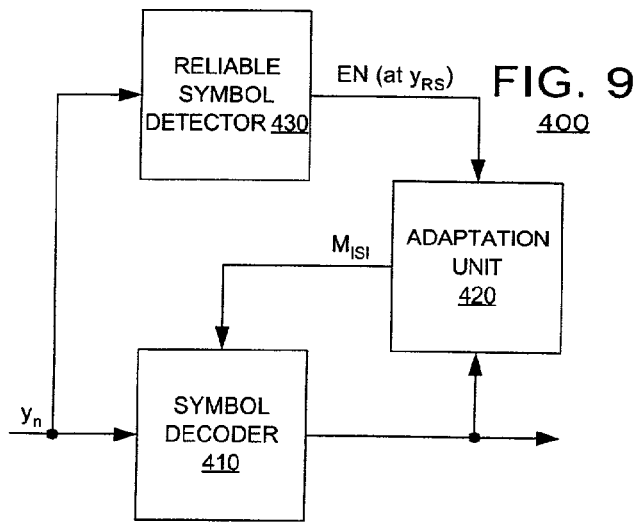
FIG. 9 is a block diagram of a data decoder according to another embodiment of the present invention.

In this embodiment shown in FIG. 9, the reliable symbol detector 430 may identify reliable symbols from the captured samples $y_n$. An output of the reliable symbol detector 430 may be an enabling input to the adaptation unit 420. When a reliable symbol is identified, the adaptation unit 420 may be enabled, causing it to revise its estimate of the ISI metrics $M_{ISI}$.

The foregoing embodiments have described use of reliable symbols to extend application of known adaptation processes to ISI estimation for high-order constellations in the presence of realistic levels of ISI without the use of training sequences. By extension, this use of reliable symbols permits data decoders to estimate high-constellation source symbols X from a sequence Y of captured samples. Advantageously, this use of reliable symbols may be made non-invasive in that it can be employed without changing known adaptation and symbol decoding processes in prior art equalization systems.

Estimation of Channel Coefficients Based on Reliable Symbols and Reliability

By way of illustration, a way in which reliable symbols can be used in ISI coefficient estimation will now be described briefly. Consider the estimation of one-dimensional ISI coefficients. After a sufficient number of reliable and their related surrounding samples have been identified, the estimation of the ISI coefficients may be obtained as the solution of a standard matrix equation:

$$\underline{\hat{a}} = (\underline{H}^T \underline{H})^{-1} \underline{H}^T \underline{\delta} \qquad (9)$$

where: $\underline{\hat{a}}$ is a vector of the ISI coefficient estimates; H is an N×M matrix, with N≧M, in which each row contains the M surrounding symbol estimates or alternatively, the corresponding M surrounding sample values for each reliable symbol, and N is the number of related detected reliable symbols (a larger N is required for lower signal to noise ratios); and δ is an N×1 vector that contains the distances of the N reliable symbols from their estimated origin points.

By way of example, consider the following situation: The ISI length is assumed to have two coefficients ($K_1=0, K_2=2$)

and the estimation is based on four reliable symbols. Let it be assumed that they correspond to time indexes: 100, 250, 300 and 320. Then, $$\delta = \{y_{100} - \hat{x}_{100}, y_{250} - \hat{x}_{250}, y_{300} - \hat{x}_{300}, y_{320} - \hat{x}_{320}\}^T \quad (10)$$

$$\underline{H} = \begin{Bmatrix} \hat{x}_{98}, \hat{x}_{99} \\ \hat{x}_{248}, \hat{x}_{249} \\ \hat{x}_{298}, \hat{x}_{299} \\ \hat{x}_{318}, x_{319} \end{Bmatrix} \quad (11)$$

Optionally, however, the performance of the ISI adaptation can be improved by integrating a reliability weight factor into the calculation of ISI metrics. Consider the case of a subtractive equalizer. In such an equalizer, an adaptation unit 320 may estimate channel coefficients $a_i$ and generate an estimate of source symbols according to Eq. 9 above.

In an embodiment, an estimate â of $\underline{a}$ may include a weighting based on reliabilities associated with received signal values. In this embodiment an estimate â of $\underline{a}$ may proceed according to:

$$\hat{\underline{a}} = (\underline{H}^T \underline{W} \underline{H})^{-1} \underline{H}^T \underline{W} \underline{\delta} \quad (12)$$

where W is a diagonal N×N matrix of reliability weights $w_{i,i}$ ($w_{i,j} = 0$ for all $i \neq j$). In one such embodiment, the reliability weights $w_{i,i}$ may be obtained as:

$$w_{i,i} = f(R_i) \quad (13)$$

where $R_i$ is the reliability factor associated with an $i^{th}$ sample value, i being a member of the set of N sample values being used in the estimation process, and f(.) is a function that increases inversely with the associated reliability factor (e.g. as defined in equation 3).

Thus, symbols of varying degrees of reliability can be used with an appropriate reliability weighting.

In an embodiment, a destination may store captured samples in a buffer memory while reliable symbols are detected and while ISI estimation occurs. Thereafter, when the ISI metrics are available, the stored samples may be read from the memory and decoded. In this regard, provided the buffer memory is appropriately sized, all captured samples may be decoded.

Estimation of Constellation Symbols in View of Channel Gain

Channel gain ($a_0$ in equation 1) can be a major parameter to be estimated in channel equalizers. To facilitate the foregoing discussion, coefficients $a_i$ are presented as normalized to the value of $a_0$. Doing so permits the presentation to discuss the constellation diagrams of FIG. 3 as being identically-sized at both the source 110 and the destination 120. In practice, unless the channel gain is a known predetermined quantity, the destination 120 may estimate the channel gain $a_0$ and, from this estimation, assign the samples $y_n$ to constellation decision regions.

The foregoing embodiments of reliable symbol detection find application in systems that may use conventional channel gain estimation techniques. Channel gain estimation may be improved, however, through use of reliable symbols. Accordingly, the following discussion presents use of reliable symbols to determine channel gain. The discussion assumes that ISI coefficients $a_i$ are unknown.

Communication through an ISI channel may cause captured samples to be observed having values that exceed the extreme points of a transmitted constellation. In fact, the samples could reach as far as $$1 + \sum_i \|S\|_i$$

times the maximum transmitted symbols. In the absence of carrier phase offset, reliable symbols are those captured samples $y_n$ that are very likely to be located in a decision region of their source symbols $x_n$.

According to an embodiment, a destination may identify a predetermined number of reliable symbols from the captured samples. Initially, those reliable symbols that have the maximum magnitude in each constellation axis may be set to the initial maximum constellation point in each axis. Let $\hat{P}_{max}^1$ be the initial estimation of the maximum constellation point, then:

$$\hat{P}_i^1 = \text{sign}(i) \cdot \frac{\hat{P}_{max}^1}{\sqrt{\text{constellation}} - 1} (2|i| - 1) \quad (14)$$

may be used as an estimation of the remaining constellation points in each axis, where i is an index traversing the number of constellation points in each axis direction and constellation represents the number of constellation points in the constellation. For irregular constellations, the calculation may be performed independently for each axis j in the constellation. For example, in QAM systems $j \in [I, Q]$. In this case, equation 14 may become:

$$\hat{P}_{i,j}^1 = \text{sign}(i) \cdot \frac{\hat{P}_{max_j}^1}{\text{axis}_j - 1} (2|i| - 1) \quad (15)$$

where $\text{axis}_j$ represents the number of constellation points in the respective axis of the constellation.

While the error in the maximum estimated points can be up to one unit, for points that are closer to zero the upper limit on the error goes down to, $$|\text{error}|_{min} \leq \frac{1}{\sqrt{\text{constellation}}} : \hat{P}_{1,-1}^1 \quad (16)$$

for the points with the smallest magnitude.

Thereafter, the constellation points may be estimated. For the $i^{th}$ constellation point $P_i$:

$$\hat{P}_i^1 = (2|i| - 1) \cdot \hat{P}_1^1 \quad (17)$$

when, $$\hat{P}_1^1 = \hat{P}_i^1 - P_1. \quad (18)$$

Let the reliable symbol $y_n^i$ be expressed by the origin point plus the related ISI noise coefficient $d_n^i$. From equations 16, 17 and 18:

$$y_n^i = P_i + d_1^1 = \hat{P}_i^1 - \tilde{P}_i^1 + d_n^i = \hat{P}_i^1 - (2|i|-1) \cdot P_1^1 + d_n^i \qquad (19)$$

where n is the index of the reliable symbol and i the index of the related constellation point. The ISI noise, $d_n^i$, can be modeled as a zero mean, almost gaussian distribution parameter that does not depend upon i. Using a weighted average estimator over $\hat{P}_i^1 - y_n^i$ where $\{y\}$ is a subset s of the reliable symbols:

$$\hat{\tilde{P}} = \frac{1}{2|i|-1} \cdot \left( \frac{1}{|S|} \sum_S P_i^1 - y_n^i \right) \qquad (20)$$

and where the expectation of $\hat{P}_1$, is:

$$E[\hat{\tilde{P}}_1^1] = E\left[ \frac{1}{2|i|-1} \left( \frac{1}{|s|} \sum_s \hat{P}_1^1 - y_n' \right) \right] \qquad (21)$$

$$= E\left[ \frac{1}{2|i|-1} \left\{ \frac{1}{|s|} \sum_s \hat{P}_1^1 - (P_i - d_n') \right\} \right]$$

$$= E\left[ \left( \frac{1}{|i|} \sum_{|s|} P_1^1 - P_1 \right) + E(d_n) \right] = \hat{P}_1^1 - \hat{P}_1 = \hat{\tilde{P}}_1^1$$

then, $$\hat{P}_i = \hat{P}_i^1 + (2|i|-1) \cdot \hat{\tilde{P}}_1 \qquad (22)$$

where $\hat{P}$ are the final estimation of the constellation points. The estimation in equation 20 may be done on the first estimation error. Equation 21 indicates that the estimation in 20 is not biased.

Figure 10:
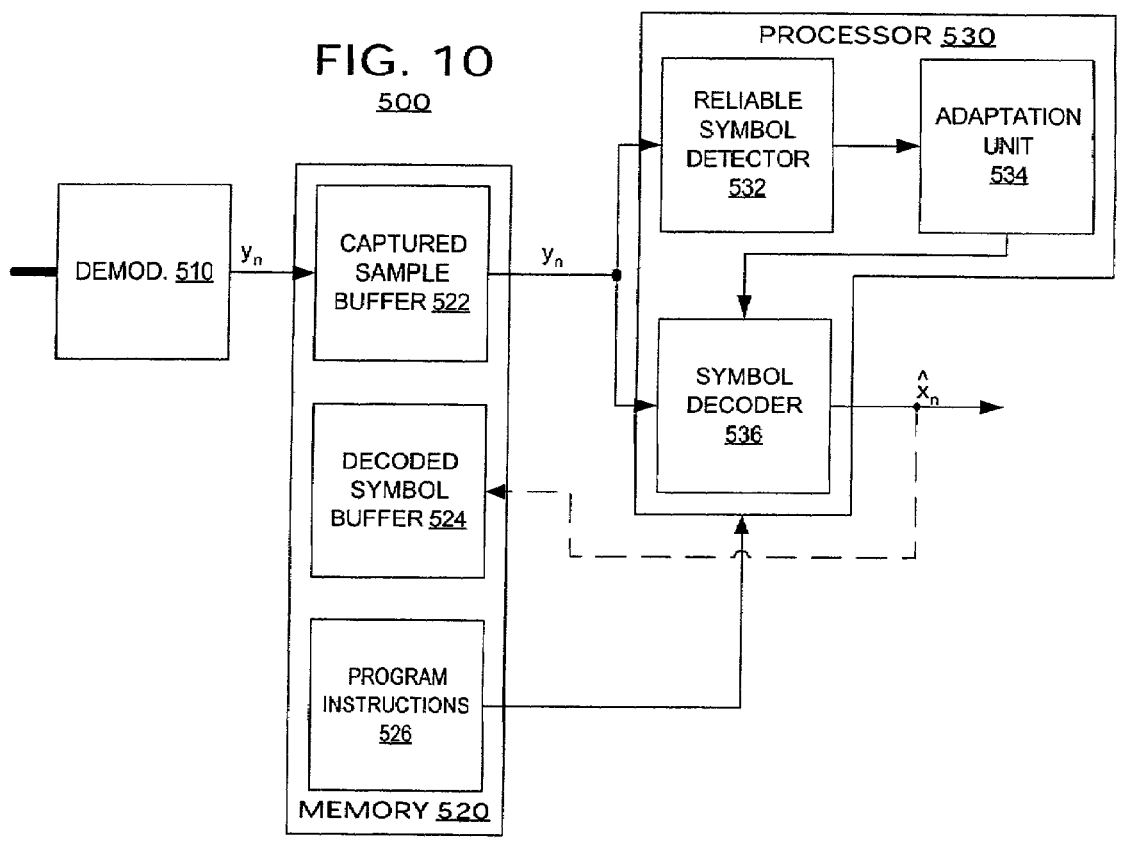
FIG. 10 is a block diagram of a receiver structure according to an embodiment of the present invention.

FIG. 10 is a block diagram of a receiver structure 500 according to an embodiment of the present invention. The receiver 500 may include a demodulator 510, a memory 520 and a processor 530. FIG. 10 illustrates communication flow among the demodulator 510, the memory 520 and the processor 530, not actual electrical interconnections among these units.

The demodulator 510 captures a signal Y from the channel and generates captured samples $y_n$ therefrom. The channel may be an electric, magnetic, acoustic, or optical propagation medium. Demodulators 510 for capturing such signals are well-known. On account of the ISI, samples from the captured signal stream generally will have no detectable correspondence to the transmitted constellation. It may take any number of values between the constellation points (e.g. 6.3, 6.5, −3.1). Captured sample data may be stored in a buffer 522 in the memory 520.

Figure 2:
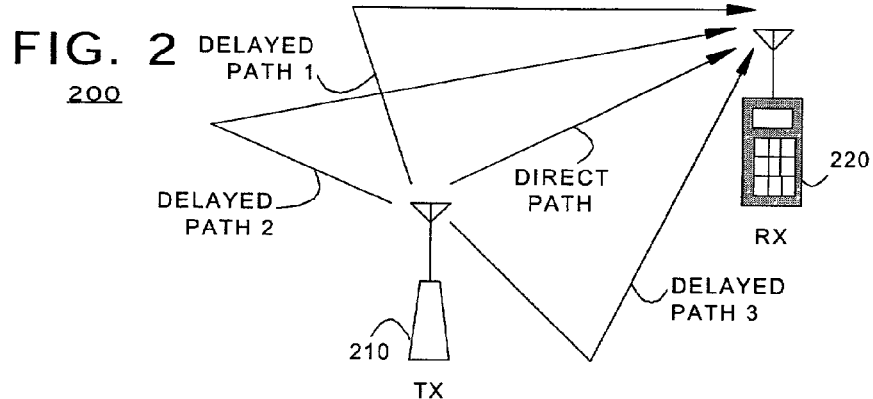
FIG. 2 illustrates an exemplary communication system in which ISI may occur due to multipath.

The memory system 520 may be logically organized to perform storage functions that may be necessary for operation of the structure 500 as an equalizer. A first area 522 of the memory may store captured samples $y'_n$ for further processing. This area may double as the frame memory 250 and buffer 270 illustrated in FIG. 2. A second area 524 of the memory may store the decoded symbols $d_n$. And, of course, a third area of memory 526 may store program instructions. The memory system 520 may be populated by electric, magnetic or optical memories or other storage elements which may be configured as a read-only memory (ROM) or random access memory (RAM).

As dictated by the instructions, operation of the processor 530 may be divided into logical units such as a reliable symbol detector 532, an adaptation unit 534 and a symbol decoder 536. The processor 530 may be a general purpose processor, a digital signal processor, an application-specific integrated circuit or a collection of processing elements. The processor 530 may generate data representing estimated source symbols $\hat{x}_n$. These estimated source symbols may be output from the receiver structure 500 or, in an alternate embodiment, be returned to the memory 520 in a decoded symbol buffer 524 to await further processing, or both.

The foregoing discussion has presented techniques for identifying, from a sequence of captured samples, reliable symbols—samples that are likely to remain within the decision region of source symbols notwithstanding the presence of ISI corruption. Further, various data decoding techniques have been presented that permit ISI estimation to be carried out based on the identified reliable symbols and, therefore, permits decoding of all captured samples to occur. Additionally, the reliable symbol techniques permit equalization to occur as a "blind" process, without requiring use of training symbols to estimate the channel effect. The inventors have simulated transmission using 64-level QAM, 256-level QAM and 4096-level QAM. Use of these transmission constellations provides a 3 to 6-fold increase respectively in data transmission rates over 4-level QAM. Thus, the present invention contributes to data transmission systems having increased throughput without incurring expense in communication bandwidth.

Although the foregoing discussion refers to intersymbol interference as a source of data corruption affecting a source signal X, application of the present invention is not so limited. The present invention finds application in any situation in which data correlated noise occurs. References herein to "ISI" should be so construed.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A reliable symbol identification method for use in a communication system for transmitting symbols of a high order constellation comprising:
   calculating a reliability factor of a captured sample from values of a plurality of other samples in proximity to the captured sample, wherein the captured sample and the plurality of other samples represent a data signal received from a communication channel, and
   if the reliability factor is less than a predetermined limit, designating the captured sample as a reliable symbol.

2. The method of claim 1, wherein the reliability factor $R_n$ of the captured sample is given by:

$$R_n = \sum_{\substack{i=-k1 \\ i \neq 0}}^{k2} |y_{n-i}|c_i, \text{ where}$$

$y_n$, is the captured sample,
$y_{n-i}$ is a sample in proximity to the captured sample,
$K_1$, $K_2$ are numbers of samples adjacent to the captured sample, and
$c_i$ is a coefficient representing any prior knowledge of intersymbol interference effects.

3. The method of claim 2, where $c_i=1$ for all i.

4. The method of claim 2, wherein $K_1=0$.

5. The method of claim 2, wherein $K_2=0$.

6. The method of claim 1, wherein the predetermined limit varies over time.

7. The method of claim 1, further comprising determining a rate at which reliable symbols are identified, and
if the rate is less than a predetermined value, increasing the predetermined limit.

8. The method of claim 1, further comprising determining a rate at which reliable symbols are identified, and
if the rate exceeds a second predetermined value, decreasing the predetermined limit.

9. The method of claim 1, wherein the reliability of a two-dimensional captured sample $y_n$ is given by:

$$R_n = \sum_{\substack{i=-k1 \\ i \neq 0}}^{k2} \sqrt{y1_{n-i}^2 + y2_{n-i}^2}\, c_i, \text{ where}$$

$y1_{n-i}$ and $y2_{n-i}$ respectively represent values of a neighboring sample $Y_{n-i}$ in first second dimensions, $K_1$, $K_2$ are numbers of samples adjacent to the captured sample, and $c_1$ is a coefficient representing any prior knowledge of intersymbol interference effects.

10. A method of identifying reliable symbols for use in a communication system for transmitting symbols of a high order constellation, comprising:
for a captured sample $y_n$ recovered from a communication channel:
initially setting a reliability factor to zero;
iteratively, for i=$-K_1$ to $K_2$, i≠0, wherein $K_1$, $K_2$ are real numbers:
adding to a reliability factor a value based on another captured sample $y_{n-i}$ also recovered from the communication channel,
if the reliability factor exceeds a predetermined limit, disqualifying the captured sample as a reliable symbol,
otherwise, incrementing i and, if i=0, re-incrementing i for a subsequent iteration; and
thereafter, unless the captured symbol has been disqualified, designating the captured sample as a reliable symbol.

11. The method of claim 10, wherein the adding adds an absolute value of the sample $y_{n-i}$ to the reliability factor.

12. The method of claim 10, wherein the adding adds a scaled value of the sample $y_{n-i}$ to the reliability factor, the value scaled in accordance with a coefficient $c_i$, representing any prior knowledge of intersymbol interference effects.

13. The method of claim 10, wherein the adding adds the power of the sample $y_{n-i}$ to the reliability factor.

14. The method of claim 10, wherein the predetermined limit is half a width of an annular constellation ring in which the captured sample is observed.

15. The method of claim 10, the predetermined limit is $(K_1+K_2)d_{min}$, where $d_{min}$ is half a distance between two constellation points that are closest together in a governing constellation.

16. The method of claim 10, wherein the predetermined limit varies over time.

17. The method of claim 10, further comprising determining a rate at which reliable symbols are identified, and
if the rate is less than a predetermined value, increasing the predetermined limit.

18. The method of claim 10, further comprising determining a rate at which reliable symbols are identified, and
if the rate exceeds a second predetermined value, decreasing the predetermined limit.

19. A method of identifying reliable symbols, for use in a communication system for trasmitting symbols of a high order constellation comprising:
for a captured sample recovered from a communication channel:
determining whether any value of a plurality of neighboring samples also recovered from the communication channel is within a predetermined limit, and
if none of the values exceed the predetermined limit, designating the captured sample as a reliable symbol.

20. The method of claim 19, wherein the predetermined limit varies over time.

21. The method of claim 19, further comprising determining a rate at which reliable symbols are identified,
if the rate is less than a predetermined threshold, increasing the predetermined limit.

22. The method of claim 21, further comprising, if the rate exceeds a second predetermined threshold, decreasing the predetermined limit.

23. The method of claim 19, wherein the plurality of neighboring samples occur in a first window adjacent to the captured sample on one side of the captured sample.

24. The method of claim 19, wherein the plurality of neighboring samples occur in a pair of windows that are adjacent to, and on either side of the captured sample.

25. A method of detecting reliable symbols within a sampled data signal for use at a receiver of a communication system for transmitting symbols of a high order constellation, comprising:
identifying a sequence of sample values having values within a predetermined limit, and
designating a sample adjacent to the sequence as a reliable symbol.

26. The method of claim 25, wherein the predetermined limit varies over time.

27. The method of claim 25, further comprising determining a rate at which reliable symbols are identified,
if the rate is less than a predetermined threshold, increasing the predetermined limit.

28. The method of claim 27, further comprising, if the rate exceeds a second predetermined threshold, decreasing the predetermined limit.

29. A data decoder for use in a communication system for transmitting symbols of a high order constellation comprising:
a reliable symbol detector to detect reliable symbols from a sequence of captured samples, the reliable symbols being the captured samples which are estimated to be located in a correct decision region of a corresponding source symbol,
an adaptation unit coupled to the reliable symbol detector to generate intersymbol interference (ISI) metrics based on the reliable symbols, and
a data decoder to receive the captured samples and estimate source symbols based on the ISI metrics.

30. An equalization method for use in a communication system for transmitting symbols of a high order constellation, comprising;
identifying reliable symbols from a string of captured samples recovered from a communication channel, the reliable symbols being the captured samples which are estimated to be located in a correct decision region of their corresponding source symbols, calculating channel effects based on the reliable symbols and samples adjacent thereto, correcting the captured samples based on calculated channel effects to equalize the string of captured samples.

31. The method of claim 30, wherein the identifying comprises:

calculating a reliability factor of a captured sample from values of a plurality of samples in the neighborhood of the captured sample, if the reliability factor is below a predetermined limit, designating the captured sample as a reliable symbol.

32. The method of claim 31, wherein the reliability factor of the captured sample $y_n$ is given by:

$$R_n = \sum_{\substack{i=-k1 \\ i \neq 0}}^{k2} |y_{n-i}|c_i, \text{ where}$$

$y_{n-i}$ is a sample in the neighborhood of the captured sample, $K_1$, $K_2$ are numbers of samples adjacent to the captured sample, and $c_i$ is a coefficient representing any prior knowledge of intersymbol interference effects.

33. The method of claim 31, wherein the reliability factor of the captured sample $y_n$ is given by:

$$R_n = \sum_{i=1}^{k} |y_{n-i}|c_i, \text{ where}$$

$y_{n-i}$ is a sample in the neighborhood of the captured sample,

K is a length of samples, and $c_i$ is a coefficient representing any prior knowledge of intersymbol interference effects.

34. The method of claim 31, wherein the reliability of a two-dimensional captured sample $y_n$ is given by:

$$R_n = \sum_{\substack{i=-k1 \\ i \neq 0}}^{k2} \sqrt{y1_{n-i}^2 + y2_{n-i}^2}\, c_i, \text{ where}$$

$y1_{n-i}$ and $y2_{n-i}$ respectively represent values of a neighboring sample $y_{n-i}$ in first second dimensions, $K_1$, $K_2$ are numbers of samples adjacent to the captured sample, and $c_i$ is a coefficient representing any prior knowledge of intersymbol interference effects.

35. The method of claim 30, wherein the identifying comprises:

identifying a sequence of samples having received signal magnitude levels below a predetermined limit, and designating a sample adjacent to the sequence as a reliable symbol.

36. The method of claim 30, wherein, for QAM transmission, the identifying comprises:

identifying a sequence of samples for which a received signal magnitude in a quadrature-phase component is below a predetermined limit, and designating an adjacent sample as a reliable symbol for quadrature-phase.

37. The method of claim 30, wherein, for QAM transmission, the identifying comprises:

identifying a sequence of samples for which a received signal magnitude in an in-phase component is below a predetermined limit, and designating an adjacent sample as a reliable symbol for in-phase.

38. The method of claim 30, wherein the calculating estimates K channel coefficients $a_i$ according to a least squared error analysis of $$y_{RS} - \hat{x}_n - \sum_{i=1}^{k} \hat{a}_i \hat{x}_{n-i},$$

solving for $\hat{a}_i$ for a plurality of reliable symbols $y_{RS}$, where $\hat{x}_n$ and $\hat{x}_{n-i}$ are estimated transmitted symbols.

39. The method of claim 30, further comprising assigning weights among the reliable symbols based upon respective reliability factors.

40. An equalizer for use in a communication system for transmitting symbols of a high order constellation, comprising:

a buffer memory, a reliable symbol detector in communication with the buffer memory, the detector to estimate which samples from a sequence of captured samples are located in a located in a correct decision region of their corresponding source symbols, an adaptation unit in communication with the reliable symbol detector to estimate channel effects based on values of the reliable symbols and samples adjacent thereto, and a symbol decoder in communication with the adaptation unit and the buffer memory.

41. The equalizer of claim 40, wherein the reliable symbol operates according to a method, comprising:

calculating a reliability factor of a captured sample from values of a plurality of samples proximate to the captured sample, and if the reliability factor is less than a predetermined limit, designating the captured sample as a reliable symbol.

42. The equalizer of claim 41, wherein the reliability factor $R_n$ of the captured sample is given by:

$$R_n = \sum_{\substack{i=-k1 \\ i \neq 0}}^{k2} |y_{n-i}|c_i, \text{ where}$$

$y_n$, is the captured sample, $y_{n-i}$ is a sample in proximity to the captured sample, $K_1$, $K_2$ are numbers of samples adjacent to the captured sample, and $c_i$ is a coefficient representing any prior knowledge of intersymbol interference effects.

43. The equalizer of claim 41, wherein the reliability of a two-dimensional captured sample $y_n$ is given by:

$$R_n = \sum_{\substack{i=-k1 \\ i \neq 0}}^{k2} \sqrt{y1_{n-i}^2 + y2_{n-i}^2}\, c_i, \text{ where}$$

$y1_{n-i}$ and $y2_{n-i}$ respectively represent values of a neighboring sample $y_{n-i}$ in first second dimensions, $K_1$, $K_2$ are numbers of samples adjacent to the captured sample, and $c_i$ is a coefficient representing any prior knowledge of intersymbol interference effects.

44. A receiver for use in a communication system for transmitting symbols of a high order constellation, comprising:

a demodulator to sample and capture transmitted data from a channel, a buffer memory in communication with the demodulator to store the values of captured samples, a processor, executing instructions that establish the following logical structures therein:

a reliable symbol detector in communication with the buffer memory to identify which of the stored captured samples are likely to be located in a correct decision region of a corresponding source symbol, identified samples being reliable symbols, an adaptation unit in communication with the reliable symbol detector to estimate channel effects from the values of the reliable symbols, and a symbol decoder unit in communication with the adaptation unit and the buffer memory.

45. The receiver of claim 44, wherein the reliable symbol detector operates according to a method, comprising:

calculating a reliability factor of a captured sample from values of a plurality of samples proximate to the captured sample, and if the reliability factor is less than a predetermined limit, designating the captured sample as a reliable symbol.

46. The receiver of claim 45, wherein the reliability factor $R_n$ of the captured sample is given by:

$$R_n = \sum_{\substack{i=-k1 \\ i \neq 0}}^{k2} |y_{n-i}| c_i, \text{ where}$$

$y_n$, is the captured sample, $y_{n-i}$ is a sample in proximity to the captured sample, $K_1$, $K_2$ are numbers of samples adjacent to the captured sample, and $c_i$ is a coefficient representing any prior knowledge of intersymbol interference effects.

47. The receiver of claim 45, wherein the reliability of a two-dimensional captured sample $y_n$ is given by:

$$R_n = \sum_{\substack{i=-k1 \\ i \neq 0}}^{k2} \sqrt{y1_{n-i}^2 + y2_{n-i}^2} \, c_i, \text{ where}$$

$y1_{n-i}$ and $y2_{n-i}$ respectively represent values of a neighboring sample $y_{n-i}$ in first and second dimensions, $K_1$, $K_2$ are numbers of samples adjacent to the captured sample, and $c_i$ is a coefficient representing any prior knowledge of intersymbol interference effects.

48. The receiver of claim 44, further comprising a second buffer memory in communication with the symbol decoder.

49. A data communication system comprising:

a source that transmits data encoded as symbols, the symbols being selected from a high-order constellation, a destination that captures a signal representing the transmitted symbols having been corrupted by at least intersymbol interference, the destination:

identifying reliable symbols from the captured samples, the reliable symbols being those captured samples that are estimated to be located in a correct decision region of their corresponding source symbols, calculating channel effects based on the reliable symbols and samples proximate thereto, and correcting other captured samples based on the channel effects.

50. The method of claim 49, wherein reliable symbols are identified according to a method comprising:

calculating a reliability factor of a captured sample from values of a plurality of samples proximate to the captured sample, and if the reliability factor is less than a predetermined limit, designating the captured sample as a reliable symbol.

51. The system of claim 50, wherein the reliability factor $R_n$ of the captured sample is given by:

$$R_n \sum_{\substack{i=-k1 \\ i \neq 0}}^{k2} |y_{n-i}| c_i, \text{ where}$$

$y_n$, is the captured sample, $y_{n-i}$ is a sample in proximity to the captured sample, $K_1$, $K_2$ are numbers of samples adjacent to the captured sample, and $c_i$ is a coefficient representing any prior knowledge of intersymbol interference effects.

52. The system of claim 50, wherein the reliability of a two-dimensional captured sample $y_n$ is given by:

$$R_n \sum_{\substack{i=-k1 \\ i \neq 0}}^{k2} \sqrt{y1_{n-i}^2 + y2_{n-i}^2} \, c_i, \text{ where}$$

$y1_{n-i}$ and $y2_{n-i}$ respectively represent values of a neighboring sample $y_{n-i}$ in first and second dimensions, $K_1$, $K_2$ are numbers of samples adjacent to the captured sample, and $c_i$ is a coefficient representing any prior knowledge of intersymbol interference effects.

53. A computer readable medium having stored thereon instructions that, when executed cause a processor to identify reliable symbols from captured samples received by a system for use in communicating data via a high order constellation by a process comprising:

calculating a reliability factor of a captured sample from values of a plurality of samples proximate to the captured sample, and if the reliability factor is less than a predetermined limit, designating the captured sample as a reliable symbol.

54. The method of claim 53, wherein the reliability factor $R_n$ of the captured sample is given by:

$$R_n \sum_{\substack{i=-k1 \\ i \neq 0}}^{k2} |y_{n-i}| c_i, \text{ where}$$

$y_n$, is the captured sample, $y_{n-i}$ is a sample in proximity to the captured sample, $K_1$, $K_2$ are numbers of samples adjacent to the captured sample, and $c_i$ is a coefficient representing any prior knowledge of intersymbol interference effects.

55. The method of claim 53, wherein the reliability of a two-dimensional captured sample $y_n$ is given by:

$$R_n = \sum_{\substack{i=-k1 \\ i \neq 0}}^{k2} \sqrt{y1_{n-i}^2 + y2_{n-i}^2}\, c_i, \text{ where}$$

$y1_{n-i}$ and $y2_{n-i}$ respectively represent values of a neighboring sample $y_{n-i}$ in first and second dimensions, $K_1$, $K_2$ are numbers of samples adjacent to the captured sample, and $c_i$ is a coefficient representing any prior knowledge of intersymbol interference effects.

56. A computer readable recording medium having stored thereon instructions that, when executed, cause a processor to correct channel effects in captured samples received by a system for use in communicating data via a high order constellation by a process comprising:

identify reliable symbols from a string of captured samples, the reliable symbols being the captured samples which are estimated to be located in a correct decision region of a corresponding source symbols, calculating channel effects based on the reliable symbols and samples proximate thereto, and correcting the captured samples based on the channel effects.

57. A method, for use in a communication system for transmitting symbols of a high order constellation, of decoding a string of captured samples recovered from a communication channel comprising:

identifying reliable symbols from the string of captured samples, the reliable symbols being the captured samples which are estimated to be located in a correct decision region of a corresponding source symbols, calculating channel effects based on the reliable symbols and samples proximate thereto, estimating transmitted symbols from remaining captured samples based on the channel effects, and outputting the estimated symbols as a decoded data signal.

* * * * *